United States Patent
Sears et al.

[11] Patent Number: 6,007,295
[45] Date of Patent: Dec. 28, 1999

[54] STICK PLACEMENT APPARATUS

[75] Inventors: Norman E. Sears, Spokane, Wash.; Clayton C. Martin, Coeur d'Alene, Id.

[73] Assignee: U.S. Natural Resources, Inc., Vancouver, Wash.

[21] Appl. No.: 09/136,875

[22] Filed: Aug. 19, 1998

[51] Int. Cl.[6] ................................................. B65G 57/26
[52] U.S. Cl. ...................................... 414/789.5; 414/792
[58] Field of Search ........................... 414/788.1, 789.5, 414/792, 927

[56] References Cited

U.S. PATENT DOCUMENTS

| | | |
|---|---|---|
| 3,904,044 | 9/1975 | Lunden . |
| 4,253,787 | 3/1981 | Lunden . |
| 4,324,521 | 4/1982 | Lunden . |

Primary Examiner—Robert P. Olszewski
Assistant Examiner—Gregory A. Morse
Attorney, Agent, or Firm—Robert L. Harrington

[57] ABSTRACT

A stick placement apparatus for a stacking machine that transfers sticks from a stick conveyor to a stacking mechanism. Transfer units are mounted to a movable carriage that is mounted strategic to the stick conveyor. The transfer unit has telescoping tubes to facilitate ease of installation and removal. Elastomeric tips are removably mounted to arms of the transfer unit. The tips being resilient will return to their original shape if bent or otherwise deformed. A cam mechanism elevates the tips of the transfer unit to engage and transfer sticks from the stick conveyor to a pan of the stacking mechanism. The tips are provided in varying lengths and are color coded to distinguish the different lengths.

5 Claims, 4 Drawing Sheets

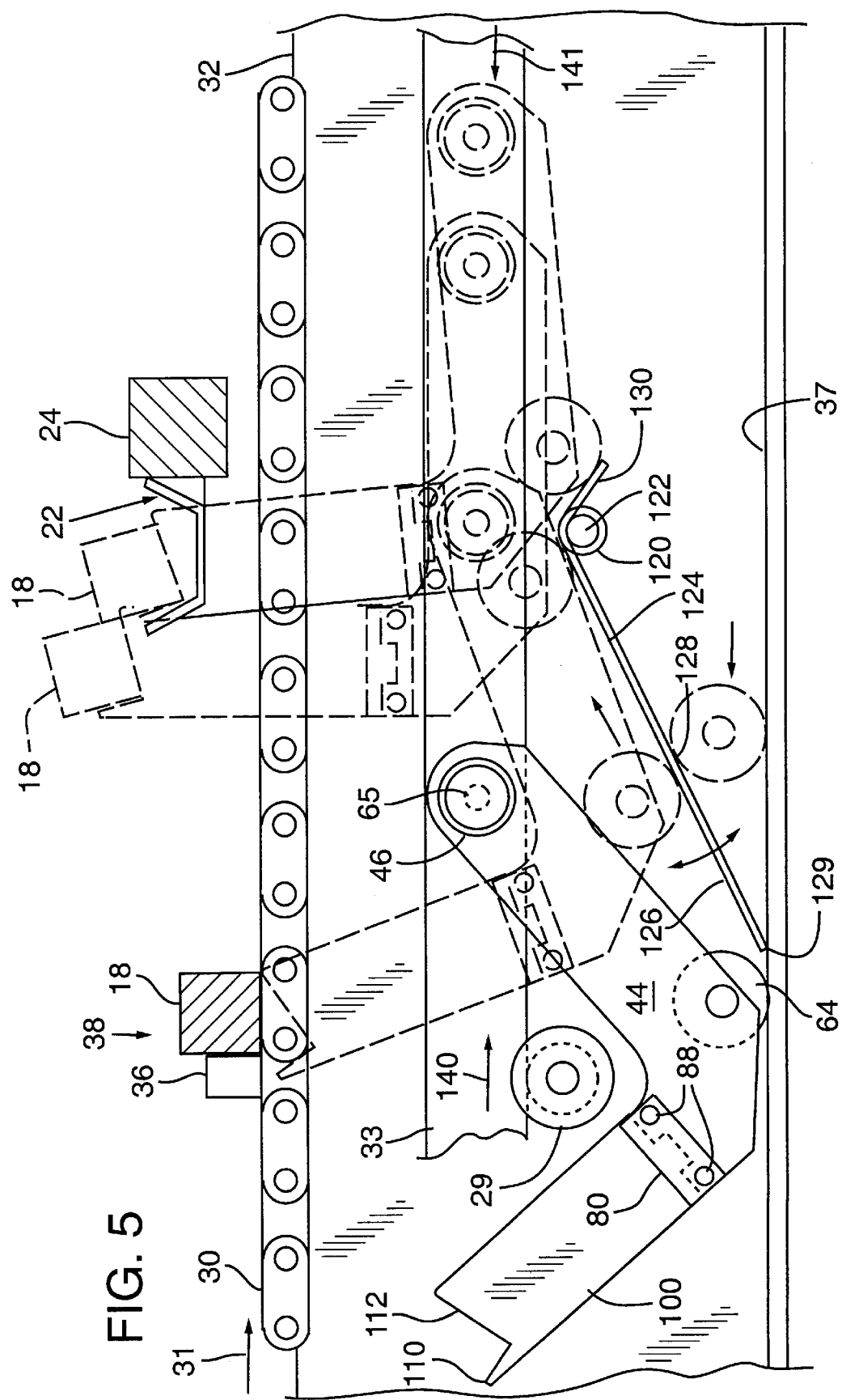

STICK PLACEMENT APPARATUS

FIELD OF INVENTION

This invention relates to an apparatus that cooperates with a lumber stacking machine wherein sticks are placed between tiers of lumber for drying, and it particularly relates to improvements in the apparatus for alleviating damage and enhanced repair of the apparatus when damaged.

BACKGROUND OF THE INVENTION

The stick placement apparatus of the present invention is the subject of prior U.S. Pat. Nos. 4,253,787 and 4,324,521, the disclosures of which are incorporated herein by reference.

Lumber that is produced from logs contains moisture that is undesirable. If allowed to dry naturally, the lumber pieces can warp and or split. This can be greatly alleviated by controlled drying. Thus the lumber is formed into tiers and the tiers into stacks that are placed in a dry kiln for controlled drying of the lumber. Very generally, the lumber pieces are conveyed on conveyors to a stacker whereat tiers of lumber pieces are placed one on top of the other by stacking forks. An automatic stick placer apparatus spaces sticks between each tier to allow air to flow freely around each tier of lumber pieces within the dry kiln.

As indicated above the apparatus for automatically placing the sticks between the tiers is described in the mentioned commonly assigned patents. Basically a conveyor conveys sticks in a desired spaced apart relation below a series of sticker forks which sequentially receives the lumber tiers and transfers the lumber tiers from the lumber conveyor to an adjacent stack. The stacker forks oscillate back and forth between the conveyor and the stack. Each fork carries a stick holding pan. A stick transfer device in coordination with stacker forks picks the sticks off the stick conveyor and places them into the holding pans adjacent each fork, just as the forks engage and transfer a tier of lumber pieces. Thus the stickers and tier of lumber pieces are simultaneously placed on the stack by the stacker forks.

The stick transfer mechanism essentially comprises multiple pairs of arms, each pair of arms operating to lift a stick off the stick conveyor and place it in a pan adjacent a fork. The timing is important as the process rapidly cycles through one stacking motion after another. The sticks have to be spaced properly and located at the right position in order for the rapidly cycled stick transfer arms to raise up under a stick and transfer the stick into position in the pan. Although the mechanism is very accurate and miscues are infrequent, occasionally a stick will shift out of it's required position on the conveyor and cause a jamming of the equipment. In such event it is likely that a stick transfer arm will become damaged. Most likely it is the lifting tip portion of the arm that gets broken or bent but on occasion the main arm structure will also be damaged.

Replacing a stick transfer arm is a fairly major repair project and requires substantial down time, a major concern for the stacking process. Any such interruption in the lumber processing operation can be very costly and is to be avoided if possible.

BRIEF DESCRIPTION OF THE INVENTION

The stick transfer arms are L shaped and include a base portion fixedly attached at one end to a carrier tube, an elbow portion at the other end of the base portion and a lifting tip projected from the elbow and having a free end that is formed to cradle a stick while transferring the stick from the stick conveyor to the pan. A pair of these arms are carried by each tube. The tube is shuttled back and forth and in one direction the arms are engaged by a cam that pivots the arms in an upward arc with the cradle end of the lifting tip raising a stick off the stick conveyor and then depositing the stick in the holding pan.

The improvement is directed to alleviating damage and in the event of damage, to facilitate repair. In the preferred embodiment, the lifting tip, i.e. beyond the elbow is a separate component of the arm that is made of tough elastomeric plastic (elastomeric in the sense that when deformed it returns to its original form.) The lifting tip is attached to the rigid elbow portion of the arm by a clamp. The joint between the lifting tip and elbow is tongue and grooved, i.e., a boss formed in the edge of the lifting tip is seated in a notch formed in the elbow. A fastening clamp carried by the elbow provides clamping jaws at each side of the lifting tip end and the jaws are clamped together to securely hold the lifting tip without penetrating through the plastic of the lifting tip.

Should a stick become misplaced on the conveyor and cause a collision with the arms, most likely such a collision would involve the lifting tip and cause the elastomeric material to become twisted. The machinery is simply stopped, the stick pulled out of the machine and the tip then restraightens itself ready to continue with the stick transfer operation. Previously such a collision would cause the lifting tip to break requiring replacement of the arm. Even if the elastomeric lifting tip of the present invention were to be damaged, it is readily replaced by loosening the clamping jaws and simply inserting a replacement tip. To this end it is to be noted that the tip end of different arms have different lengths. The tips of the arms of the pair of arms are different lengths and also from one machine to another the tip arm may be of different lengths. The present invention provides the different tip ends with different colors of elastomeric plastic to thereby facilitate correct replacement of the tips.

On occasion the rigid base arm may be broken. To facilitate replacement of the base arm, the carrier tube which carries the arms telescopes, i.e. a pair of tube portions are mounted to a central shaft and at least one of the tube portions slides on the shaft toward and away from the other tube portion. The opposite ends of the tube portions rotatably fit onto bearing studs which are secured to the frame of the machine. A locking screw secures the slidable tube portion to the shaft to provide a fixed length tube that rotates around the studs. When the arm assembly (arms and carrier tube) is to be removed, the locking screw is released and the tube is collapsed to free the tube from the mounting studs.

The invention will now be explained in more detail with reference to accompanying drawings.

BRIEF DESCRIPTION OF THE DRAWINGS

FIG. 5 is a view illustrating the operation of the transfer mechanism of FIG. 4.

DESCRIPTION OF THE PREFERRED EMBODIMENT

Figure 1:
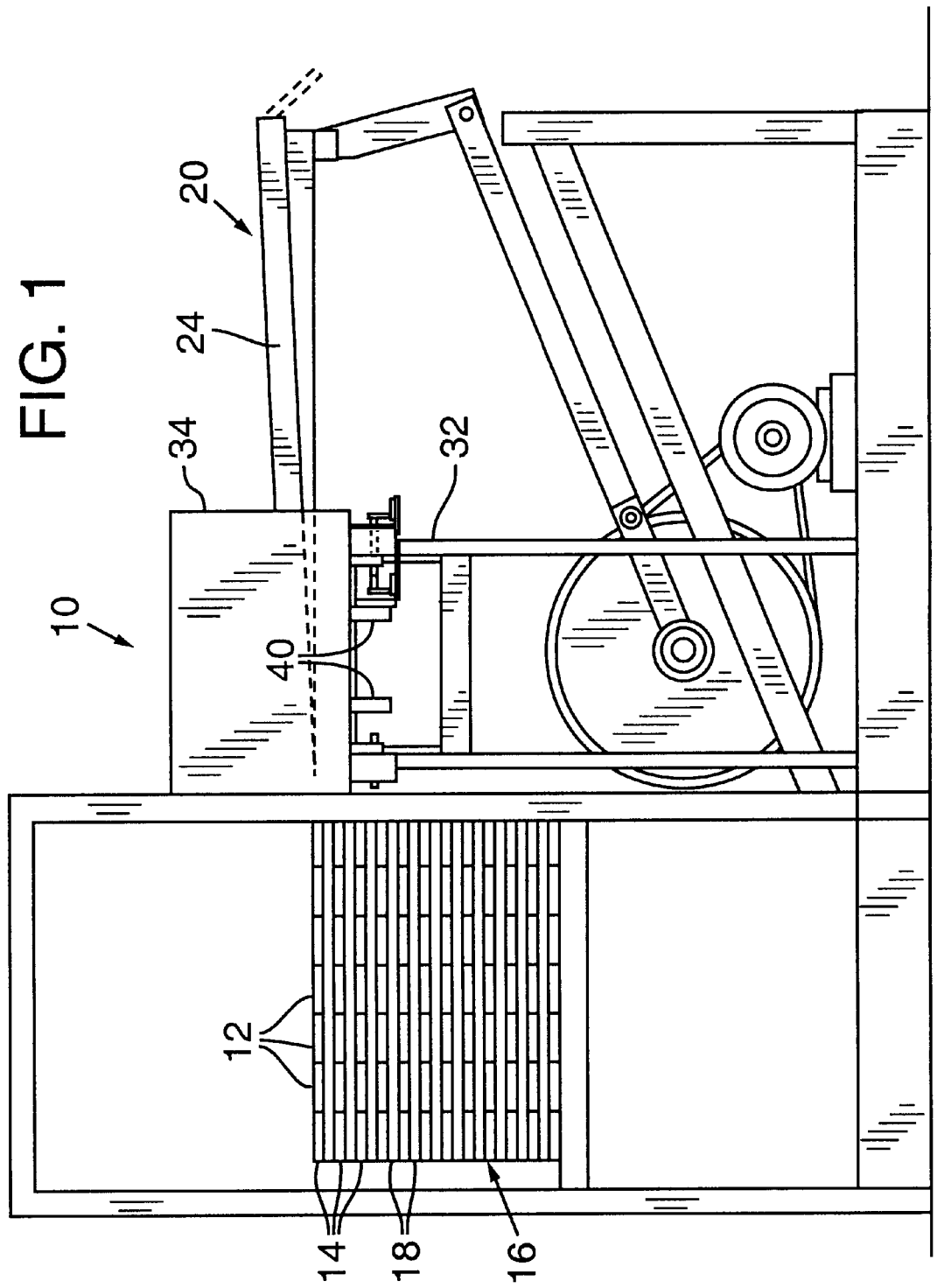
FIG. 1 is a side view and FIG. 2 is a top view of a lumber stacking machine in diagram form.
Figure 2:
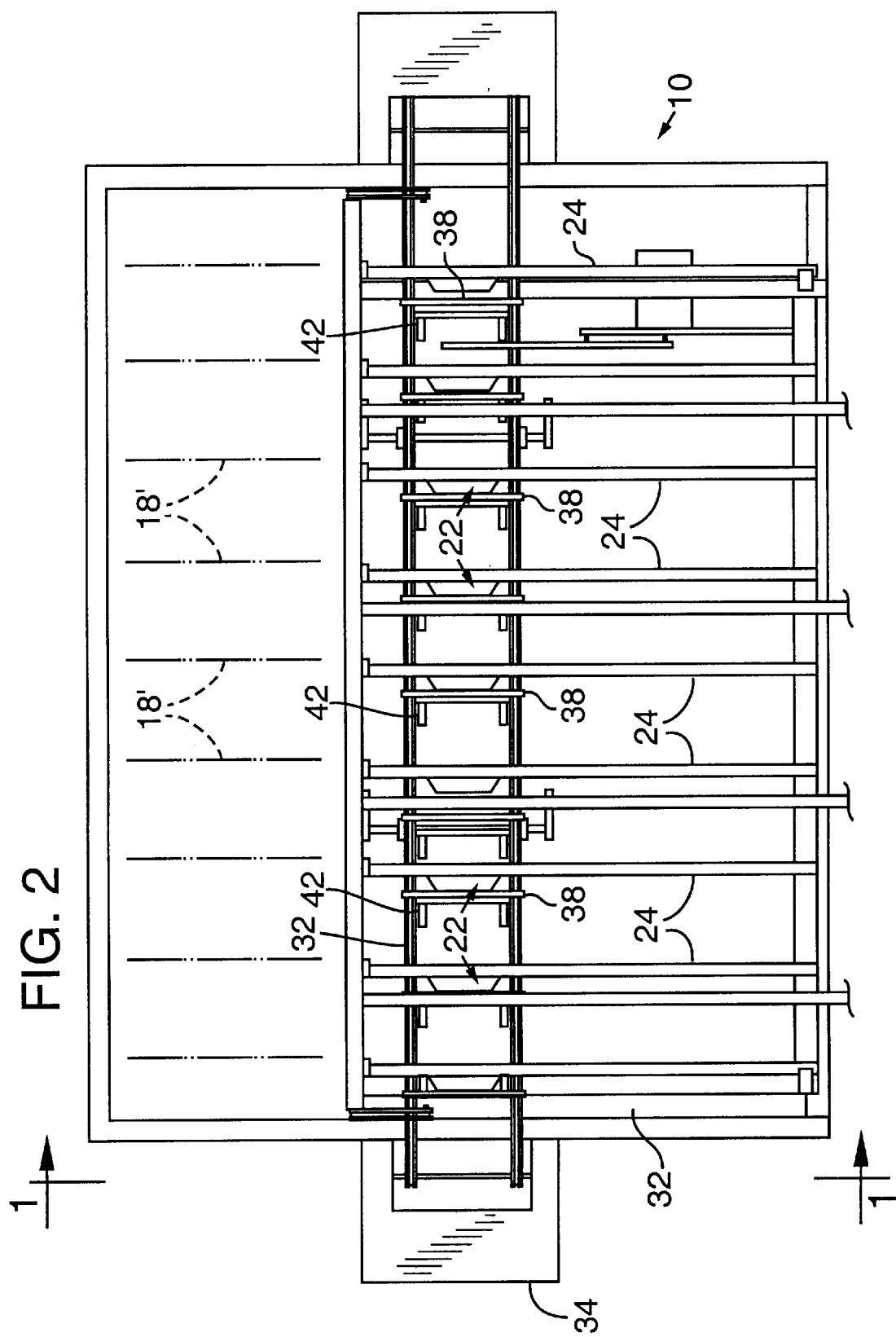

FIGS. 1 and 2 illustrate an automatic lumber stacking machine 10. The machine 10 is arranged to automatically stack lumber such as boards 12 in successive layers 14 to form a stack 16. In this embodiment, each layer 14 is separated by multiple stickers (sticks) 18 placed between each layer 14 of boards 12. In FIG. 2 lines 18' indicate the spaced arrangement of sticks 18. As will be noted, the longitudinal length of the stickers 18 are transverse to the length of the boards 12 and are placed at intervals along the length of the boards 12. The machine 10 has a stacking mechanism 20 for automatically transferring a board layer 14 and the corresponding stickers 18 onto the stack 16. The operation of the machine 10 including stacking mechanism 20 is further described and illustrated in the U.S. Pat. Nos. 4,324,521 and 4,253,787 which have been incorporated into the specification by reference.

This present invention is more specifically directed to a sticker transfer mechanism that transfers individual sticks 18 from a stick conveyor to a transfer tray of the stacking mechanism 20 as will now be explained.

Figure 4:
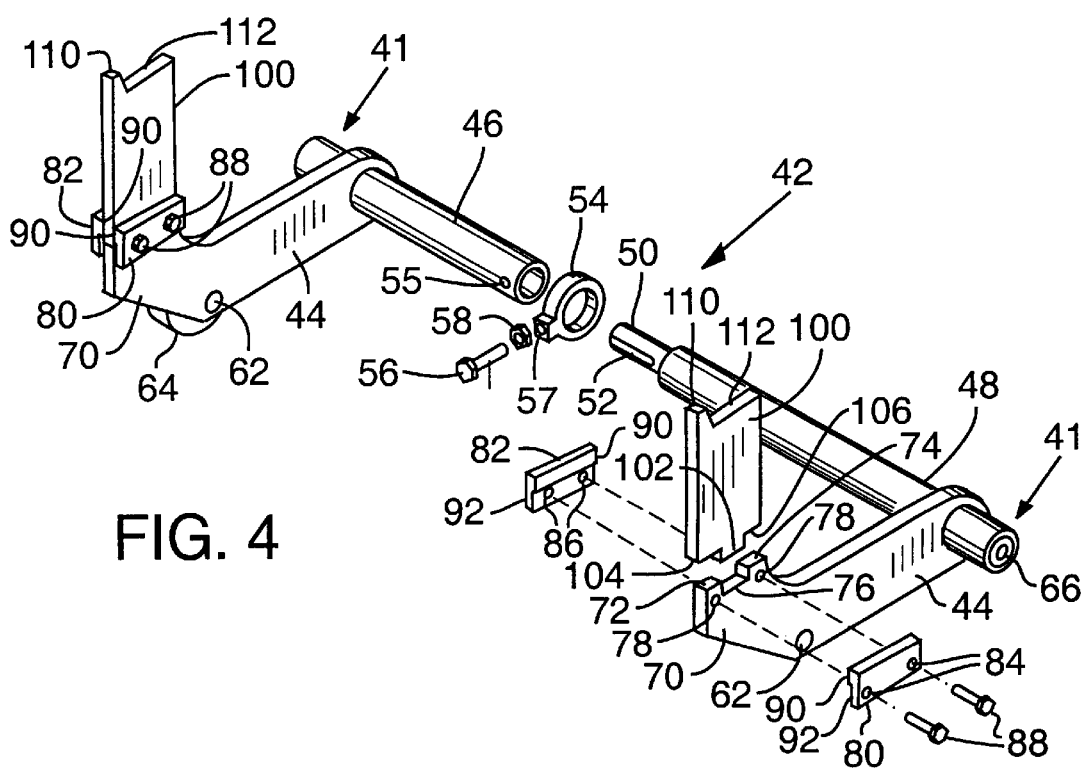
FIG. 4 is an exploded view of a sticker transfer mechanism utilized in the stacking machine of FIGS. 1 and 2.

A stick conveyor 30 (FIG. 5) is mounted to a frame 32 of the machine 10. A sticker magazine 34 (FIGS. 1 and 2) supplies stickers 18 to the conveyor 30. The conveyor 30 has multiple upstanding tabs 36 that engage and convey individual sticks 18 along the conveyor to specific locations from which the sticks are transferred to the transfer tray. These locations are referred to as transfer stations 38. The conveyor 30 is timed to the cycle of the transfer mechanism 20 to supply individual sticks 18 to the transfer stations 38. A sticker transfer mechanism 42 (the components of which are illustrated in FIG. 4) operates (as shown in FIG. 5) to transfer the sticks 18 from the stations 38 to trays 22 on the stacking mechanism 20. In this embodiment the trays 22 are mounted to forks 24 that transfer the boards 12 and the stickers 18 onto the stack 16.

Figure 3:
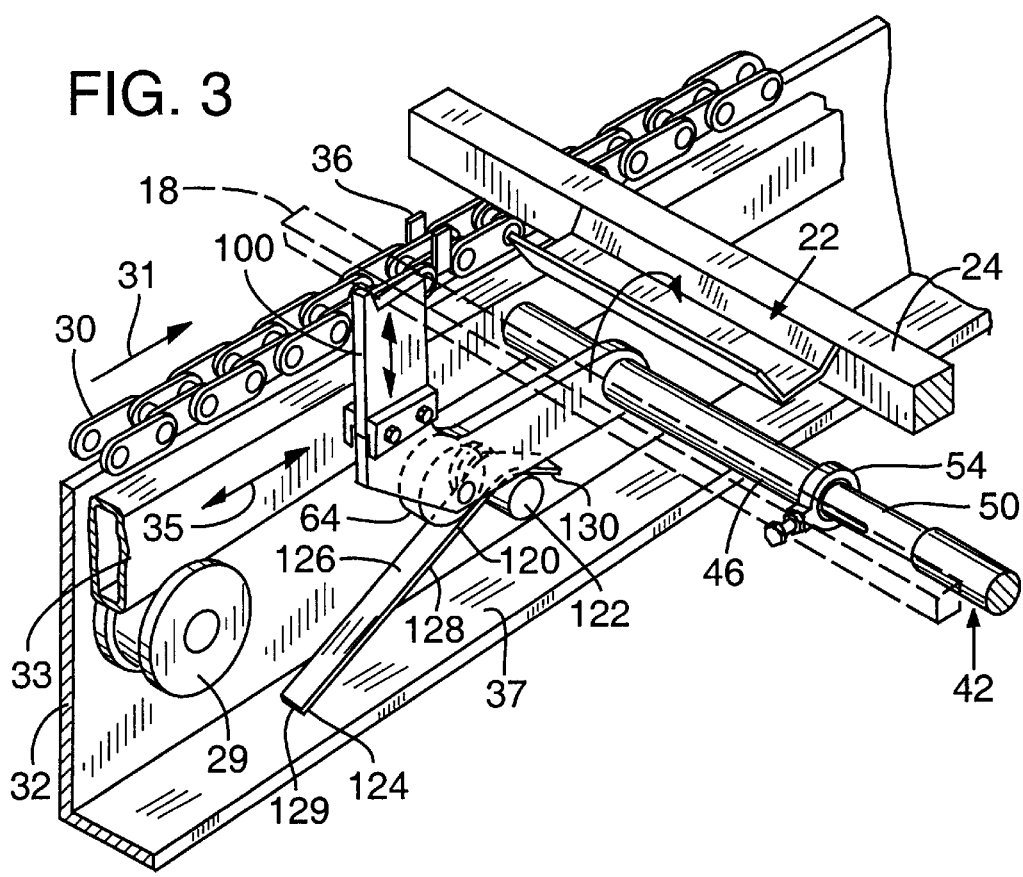
FIG. 3 is a partial perspective view of the stacking machine of FIGS. 1 and 2.

Referring to FIGS. 3 and 5, the conveyor 30 is mounted on the frame 32 and is movable in the direction indicated by arrow 31. The upstanding tabs 36 of the conveyor 30 engage and convey a plurality of the stickers 18 to their respective stations 38. A carriage 33 (consisting of parallel spaced apart rails) is movably mounted to the frame 32 on rollers 29. The carriage 33 is movable by known mechanism in a reciprocating manner as indicated by the bi-directional arrow 35 in FIG. 3. The ends (arrow 41 in FIG. 4) of transfer unit 42 are pivotally mounted to studs 65 (FIG. 5) provided on each of the pair of side rails of carriage 33.

With specific reference to FIG. 4, the transfer unit 42 has L-shaped arms 44 fixedly mounted near each end of tubes 46, 48. As shown, one end of an elongate base portion of the arms 44 is connected to the tubes 46, 48. A shaft 50 is fixedly mounted in the tube 48 with the shaft 50 extending axially outwardly from an end of the tube 48. A groove 52 is formed in the portion of the shaft 50 that extends outward from the tube 48. The grooved end of the shaft 50 is slidably insertable into the tube 46. The tube 46 with the shaft received therein may be moved toward and away from the tube 48 in a telescoping manner. A collar 54 is mounted on the tube 46. The collar 54 has a stud 56 threadably installed in a conventional tapped bore 57 provided in the collar. A locknut 58 is threadably installed on the stud 56 and is provided to lock the stud 56 to the collar 54. A conventional bore 55 is provided in the sidewall of the tube 46 to receive the stud 56. The bore 55 in the tube 46 is positioned such that when the stud 56 (installed in the collar 54) is threadably advanced through the bore 55 in the tube 46 and engages the groove 52 in the shaft 50 the arms 44 mounted to the tubes 46, 48 will extend radially from the tubes 46, 48 along the same plane. Each end of the tubes 46, 48 are bored to receive a bushing 66. The bushings 66 installed in the ends of the tubes 46, 48 support the transfer unit on conventional bearing studs 65 (see FIG. 5) provided on the rails of carriage 33. The bearing studs 65 project inwardly into the bushings 66 of the tubes 46, 48.

An aperture 62 is provided in each arm 44 for the mounting of a roller assembly 64 in a conventional manner. Only one roller 64 is shown mounted to one arm for drawing clarity. In use, a roller 64 is mounted on the other arm as well. Each arm 44 has an elbow portion 70 on which a lifting tip 100 is removably mounted. FIG. 4 shows the elbow portion 70 and the arrangement for mounting the lifting tip 100 onto the end of the elbow 70. The elbow 70 has two flats 72, 74 that lie on the same plane and a groove (notch) 76 is formed between the flats 72, 74. Holes (apertures) 78 are provided in the elbow 70 in close proximity to the flats 72, 74. Clamps 80, 82 are provided to clamp the tip 100 to the elbow 70. Clamp 80 has through bores 84 that are alignable with the holes 78 in the elbow 70. Clamp 82 has drilled and tapped through bores 86 that are alignable with the holes 78 of the elbow 70. Fasteners 88, such as cap screws are provided to secure the clamps 80, 82 and the tip 100 to the elbow 70. Each clamp 80, 82 has a jaw (leg) 90 that projects from the body 92 of the clamp 80, 82.

The tip 100 has a tongue (boss) 102 on one end sized to fit in the groove 76 of the elbow 70. Flats 104, 106 adjacent the tongue 102 of the tip 100 will abut the flats 72, 74 of the elbow 70 when the tongue 102 of the tip 100 is inserted into the groove 76. The tip 100 when mounted to the elbow 70 is secured to the elbow 70 by the clamps 80, 82. The clamps 80, 82 are initially loosely mounted to the elbow 70 by the screws 88. The clamp 80 is positioned on one side of the elbow 70 and the clamp 82 on the other side with the bores 84, 86 of the clamps aligned with the holes 78 of the elbow 70. The screws 88 are inserted through the bores 84 of the clamp 80 and the holes 78 of the elbow 70 and are threadably installed in the threaded bores 86 of the clamp 82. The tip 100 is mounted to the elbow 70 with the tongue 102 fitting in the groove 76 of the elbow 70. The jaws 90 of the clamps 80, 82 will when forced together by the tightening of the fasteners 88 will be forced against the tip 100 and will compress and hold the tip 100 in position. In the event that the tip 100 needs to be removed, the fasteners 88 are simply loosened sufficient to release the grip on the tip 100.

The end opposite the tongue 102 on the tip 100 has a leg 110 extending from an end 112. The leg 110 extends from one side of the tip 100. The extending leg 110 and the end 112 form a cradle that will engage and lift a sticker 18 off the conveyor 30.

The tip 100 is selected from a tough, durable, resilient material that is elastomeric in nature. The tip 100 may be bent or otherwise deformed without damage. When the forces that cause the bending or deformation are removed, the tip reverts to its natural shape. The tip 100 may be provided in different lengths to suit. The tips 100 are also provided in different lengths to accommodate the requirement of a particular machine or a particular operation of the machine. The different lengths of tips 100 may be of different colors to distinguish one from the other.

Tips 100 having slightly different lengths that are mounted on the arms 44 provide for a more controlled landing of the stick 18 in the tray 22. The arm 44 with the longer tip 100 will elevate the stick higher than the arm 44 with the shorter tip 100. As the transfer unit 42 descends (leaves the trailing flight 130) the end of the stick 18 supported by the shorter tip 100 will land on the tray 22 before the end of the stick 18 supported by the longer tip 100. The stick 18 then will in effect pivot onto the tray rather that fall abruptly.

A cam mechanism 120 is provided strategic to each transfer unit 42 (best seen in FIGS. 3 and 5). A cam mechanism 120 is pivotally mounted to each side of the frame 32 on a stud 122 in a conventional manner. A cam mechanism 120 is thus provided for each side of the transfer unit 42. The cam mechanism 120 has a formed cam referred to as leading flight 124 that extends in one direction from the stud 122 and a trailing flight 130 that extends from the stud 122 in the other direction. The flight 124 has an upper surface 126 and a lower surface 128. The end 129 of the flight 124 is normally in contact with a leg 37 of the frame 32.

Refer now to FIG. 5 of the drawings. As previously mentioned, the conveyor 30 has extending tabs 36 that engage and convey sticks 18 in the direction indicated by arrow 31. FIG. 5 illustrates a stick 18 being transported by the conveyor 30 to the transfer station 38 and further illustrates the carriage 33 being moved in the direction indicated by arrow 140. Initially the roller 64 of the transfer unit 42 is riding on the leg 37 of the frame 32. As the carriage 33 progresses, the roller 64 mounted on the arm 44 of the transfer unit 42 will engage the leading flight 124 of the cam member 120 and will ascend up the leading flight 124 with the roller 64 in contact with the upper surface 126. The combined motion of the carriage 33 and the roller 64 ascending the leading flight 124 causes the arms 44 and the tips 100 mounted thereon to move upwardly. The leg 110 and end 112 of the tip 100 will engage the stick 18 and lift the stick 18 off the conveyor 30. As the roller 64 continues upward on the leading flight 124, the stick 18 will be elevated and positioned above the tray 22. As the roller 64 descends down the trailing flight 130, the tip 100 will be lowered and the stick 18 will be deposited in the tray 22. When the roller 64 leaves the trailing flight 130, the transfer unit 42 will pivot downward with the roller 64 coming into contact with the leg 37 of the frame 32. The direction of the carriage 33 is then reversed and will travel in the direction indicated by arrow 141. The roller 64 will come into contact with the lower surface 128 of the leading flight 124 causing the leading flight 124 to pivot upward permitting the roller 64 to pass and return to its original starting point. The cycle is repeated for transfer of the next batch of sticks 18 on the conveyor 30.

The machine 10 includes known mechanism to pivot the leading flight 124 of the cam mechanism 120 upward so that the wheel 64 when it travels along the leg 37 of the frame 32 will travel under the leading flight 124 and thus will not be elevated to and through the station 38. Should a stick 18 be in the position to be transferred it is simply conveyed to the end of the conveyor 30 as the conveyor conveys the next series of sticks 18.

The arrangement of the transfer unit 42 provides for the rapid removal and replacement of the transfer unit. The telescoping nature of the tubes 46, 48 facilitates rapid and easy installation and removal. To install, the tube 46 is slid on the shaft 50 toward the tube 48 permitting the installation of either the tube end 46 (with the bushing 66) onto the stud 65 or the tube end 48 onto the stud 65. The tube 46 is then slid on the shaft 50 until the bushing 66 on the remaining tube end is installed on the other stud 65. The stud 56 is then tightened against the groove 52 of the shaft 50 to secure the tubes 46, 48 in the adjusted position. The locknut 58 is tightened to prevent the loosening of the stud 56. To remove the unit, the operation is reversed, that is the locknut 58 is loosened, the stud 56 retracted and the tube 46 is slid on the shaft 50 toward tube 48. This permits the unit 42 to be removed from the carriage 33.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A stick transfer apparatus used in a lumber stacking process comprising:

a carrier tube and a pair of stick transfer arms mounted to the carrier tube, said carrier tube mounted for reciprocating movement along a pathway, and a mechanism that produces cooperative pivoting of said arms in conjunction with the reciprocating movement of the carrier tube to provide the lifting action of the arm ends for transferring sticks from a stick conveyor to a transfer pan;

said pair of stick transfer arms being L shaped with an elongated base portion connected at one end to the carrier tube, an elbow portion at the other end of the base portion and an elongated lifting tip portion extended from the elbow portion at an angle to the base portion, said base portion and said elbow portion of rigid material and said tip portion being an elastomeric material and removably attached to said elbow portion.

2. A stick transfer apparatus as defined in claim 1 wherein the tip portion is attached to the elbow portion by a clamping member having jaws that clamp the end of the tip portion while avoiding penetration through the tip portion.

3. A stick transfer apparatus as defined in claim 2 wherein the elbow portion and lifting tip portion have ends that are in abutment, the ends being mated with a boss on one end and a notch in the other end which are interfitted.

4. A stick transfer apparatus as defined in claim 2 wherein the tip portions of the pair of lifting arms are of different length and are color coded to indicate correct replacement thereof.

5. A stick transfer apparatus as defined in claim 1 wherein the carried tube comprises telescoping sections, the carrier tube extended between bearing studs which are partially projected into the ends of the carrier tube, and a locking member locking the carrier tube against telescoping movement with the carrier mounted in place and extended between said bearing studs, said locking member being releasable to allow telescoping collapse of the tube and removal of the tube from the bearing studs.

* * * * *